United States Patent [19]

Pavlik

[11] 4,307,911
[45] Dec. 29, 1981

[54] REINFORCEMENT MEANS FOR RESISTING SIDE IMPACTS AGAINST AN AUTOMOBILE DOOR

[75] Inventor: Michael J. Pavlik, Norristown, Pa.

[73] Assignee: The Budd Company, Troy, Mich.

[21] Appl. No.: 118,535

[22] Filed: Feb. 4, 1980

[51] Int. Cl.³ ............................................. B62D 25/04
[52] U.S. Cl. ..................................... 296/188; 296/146
[58] Field of Search ........................ 296/146, 188, 202

[56] References Cited

U.S. PATENT DOCUMENTS

| | | | |
|---|---|---|---|
| 3,718,364 | 2/1973 | Fischer et al. | 296/146 |
| 3,776,588 | 12/1973 | Sabajima et al. | 296/146 |
| 3,788,686 | 1/1974 | Rossie et al. | 296/146 |
| 3,819,228 | 6/1974 | Cornacchia | 296/146 |

FOREIGN PATENT DOCUMENTS

| | | | |
|---|---|---|---|
| 2254840 | 6/1973 | Fed. Rep. of Germany | 296/146 |
| 2426705 | 12/1975 | Fed. Rep. of Germany | 296/146 |
| 2444018 | 3/1976 | Fed. Rep. of Germany | 296/146 |

Primary Examiner—Joseph F. Peters, Jr.
Assistant Examiner—Ross Weaver
Attorney, Agent, or Firm—A. L. Trueax, Jr.

[57] ABSTRACT

A door connected between reinforced "A" and "B" posts of an automobile includes a horizontal beam extending from the front to the rear of the door. Extension members are connected to the beam with interlock members connecting the extension members to the side sill of the automobile.

10 Claims, 10 Drawing Figures

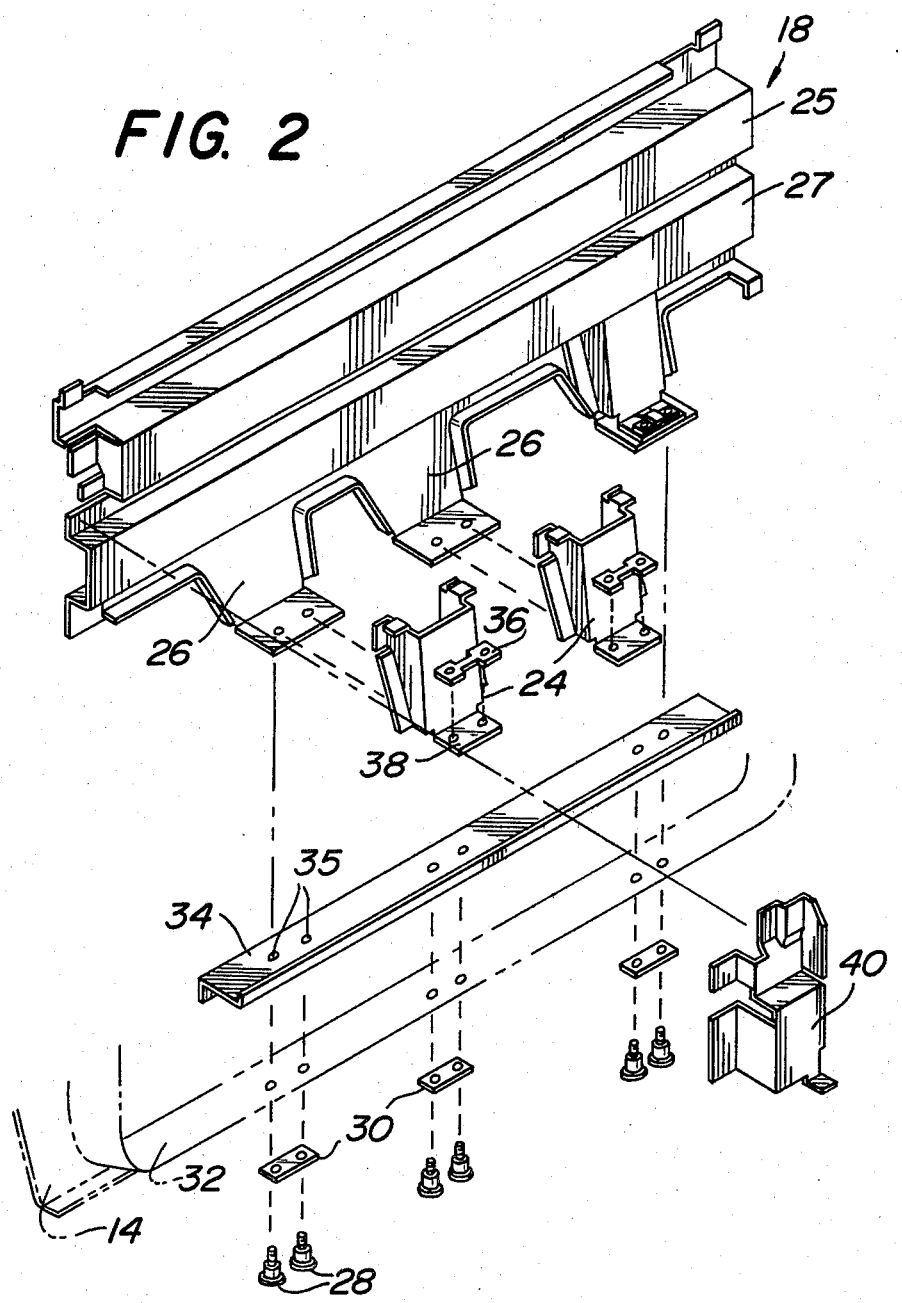

REINFORCEMENT MEANS FOR RESISTING SIDE IMPACTS AGAINST AN AUTOMOBILE DOOR

BACKGROUND OF THE INVENTION

Various means for reinforcing automobile doors and protect them against intrusion resulting from side impacts have been used. Generally, beams have been connected between the front and rear of the door to provide added strength to the door. While some consideration has been given for utilizing such beams to absorb impact forces, very often they are not located in positions so as to provide maximum protection against high side impact forces. Even in cases where such door beams were properly positioned, they often were not designed in conjunction with other parts of the automobile so as to be able to adequately transmit the forces generated in the door into the "A" and "B" posts and side sill of the automobile.

OBJECTS OF THE INVENTION

It is an object of this invention to provide a door in an automobile with improved side impact resistance.

It is a further object of this invention to provide a door in an automobile with improved means for transmitting impact forces from the door to the side sill and posts.

It is still a further object of this invention to provide an improved "A" post for an automobile which reinforces the hinge connections to minimize failure of the hinges in the event of side impacts against the door.

It is still a further object of this invention to provide an improved "B" post for an automobile with improved means for transmitting the forces in the door to the "B" post.

It is still a further object of this invention to provide an automobile door operative with a side sill of improved strength to receive impact forces from the door and provide high intrusion resistance in the event of side impact.

SUMMARY OF THE INVENTION

In accordance with the present invention, an automobile includes "A" and "B" posts for receiving a door therebetween. A side sill is disposed below the door and between the posts. A beam having a relatively constant cross sectional area extends horizontally between the front and rear of the door. The beam is aligned with a hinge on the door connected to the "A" post and a pin on the "B" post so that forces may be transmitted from the door directly to the posts. A plurality of extension members extend downwardly from the beam toward the bottom of the door. Interlocking means connect the extension members from the bottom of the door to the side sill to transmit force from the beam to the side sill. The force generated in the side sill is transmitted to other parts of the car including the posts.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is an inside view, partly broken away, of a door in accordance with the present invention;

FIG. 2 is an exploded view illustrating portions of the door, the reinforcement beam and extension member illustrated in FIG. 1;

DESCRIPTION OF THE INVENTION

Figure 7:
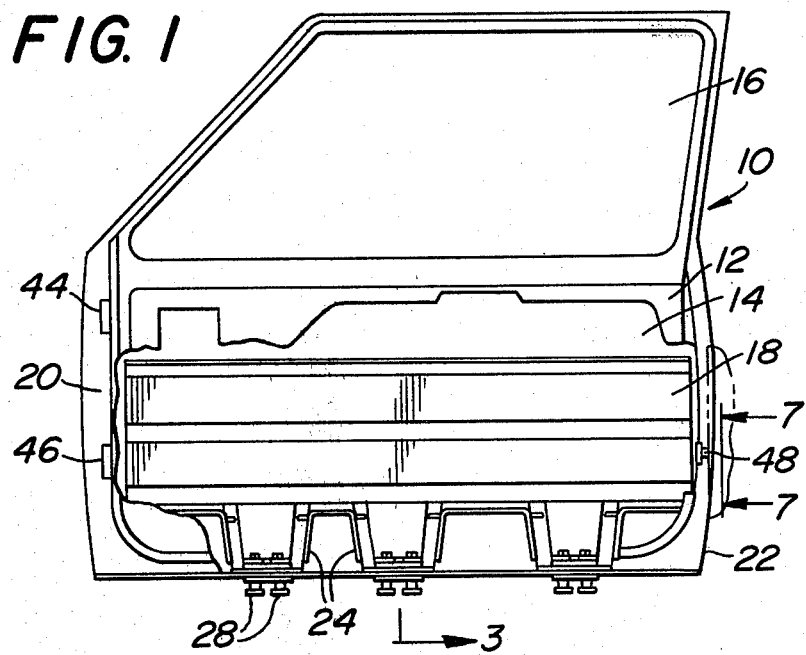
FIG. 7 is a view taken along line 7—7 of FIG. 1.

Referring particularly to FIGS. 1-5, an automobile door 10 includes an inner panel 12 and an outer panel 14. The door 10 may be of a conventional design to include a window 16 with the door adapted to be connected between "A" and "B" posts in the automobile. As far as the external appearance is concerned, the door 10 is conventional and the details relating thereto will not be referred to again.

A beam 18 is secured by adhesive or other suitable means to the outer panel 14. The beam 18 extends from the front of the car door 20, which is adapted to be connected to the "A" post, to the rear side 22, which is adapted to close next to the "B" post. The beam 18 has substantially the same cross-sectional area along its entire width. Because of this, the beam will offer high impact resistance regardless of whether it is hit toward the middle of the door or toward either side of the door. The door beam 18 may include channel like sections 25 and 27 for strength. The beam 19 may be considered as a fixed beam as opposed to beams which are pinned down.

A plurality of extension members 24 are dimensioned to fit into extensions or sections 26 which are integral with the panel 18. Each of the extension members 24 include a pair of studs 28 which provide door to side sill interlocks, as will be described.

As illustrated in FIG. 2, studs 28 are threaded and are dimensioned to pass through plates 30, the bottom of the panel 32 of the door, through openings 35 in a Z-panel lower door reinforcement 34, capping plate 36 through openings 38 in the extension members 24 to capping plates 36. Also illustrated in FIG. 2 is an inner door reinforcement member 40.

Figure 3:
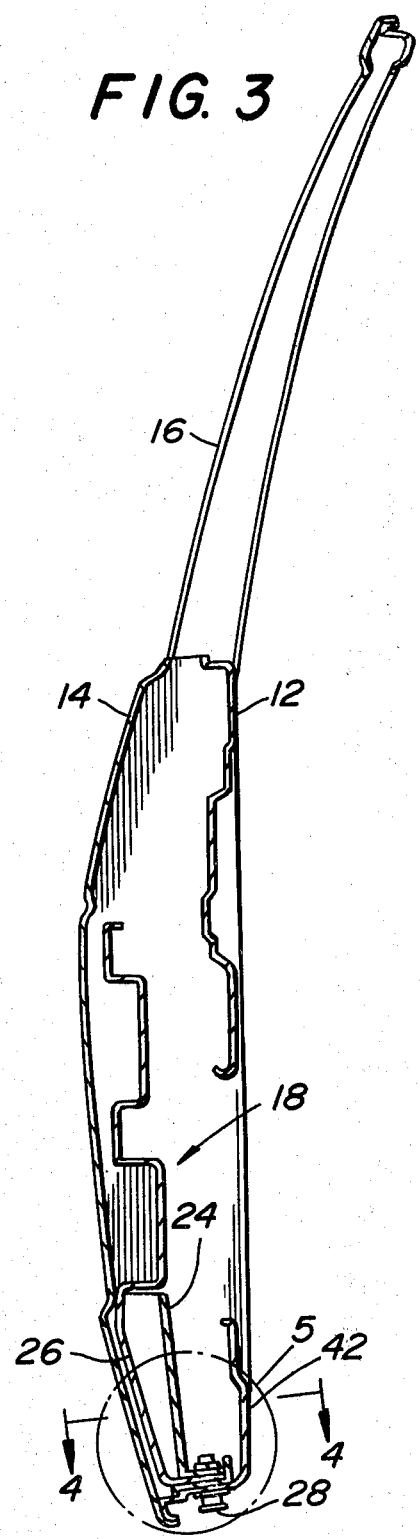
FIG. 3 is a view taken along lines 3—3 of FIG. 1.
Figure 4:
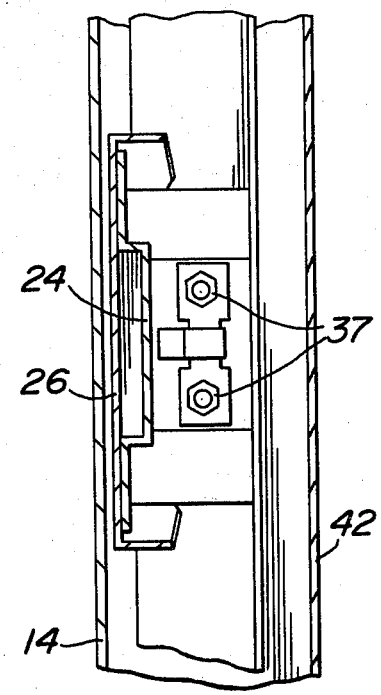
FIG. 4 is a view taken along lines 4—4 of FIG. 3.

Referring to FIG. 3, additional elements not illustrated in FIG. 2 are shown. The strip section 42 may be considered as part of the bottom 32 as far as the connections for the studs 28 are concerned. The section of the lower panel 42 extends below the locking mechanism and is suitably welded or secured to the outer panel 14.

Hinge elements 44 and 46 are connected to the front side of the door 20 and adapted to be connected to the "A" post of the automobile. A pin member 48 is secured to the "B" post of the automobile. The beam 18 is disposed at a height corresponding to the height of a typical bumper. The reason for this is that any side impact will probably involve the bumper of another car. As will be more clearly described in the subsequent figures, forces generated in the panel 18 as a result of side impacts are transmitted to the "A" post through the hinge 46 and to the "B" post through the pin 48. In addition, the forces in the panel or beam 18 are transmitted through the interlocking mechanism including extension members 24 and studs 28 to the side sill of the automobile. The forces in the side sill in turn will be transmitted to the "A", "B" posts and vehicle, floor, roof and cowl structure of the automobile.

It is noted that the horizontally disposed beam with a relatively constant cross beam from the front to the rear of the door assures that side impact forces will be absorbed at all points across the door and not just at the center. Beam 18 is also a fixed beam as opposed to a pinned beam. This permits the transfer of energy or the loads from the front and rear portions of the door.

The entire structure of the door is designed to transmit the impact forces generated in the beam 18 into other parts of the car. Because of the high efficiency in transmitting the forces in the beam 18, it is necessary to reinforce the "A" and "B" posts and the side sill in order to make them capable of receiving the forces transmitted from the beam 18 of the door.

If the "A" and "B" posts and the side sill are not capable of sustaining sufficient forces, the efficient transfer of energy from the beam 18 of the door will be ineffective. For example, if the forces transmitted to the "A" post through the hinge is too great, it will tend to peal off the hinge and cause the "A" post to rotate. Also, if the "B" post is not made sufficiently strong, it too will tend to rotate when sufficient forces are applied thereto from the door through the pin 48. Also, because the extension members 24 transmit forces from the beam 18 to the side sill, it is necessary to reinforce the side sill in order to efficiently sustain the forces transmitted thereto.

Figure 5:
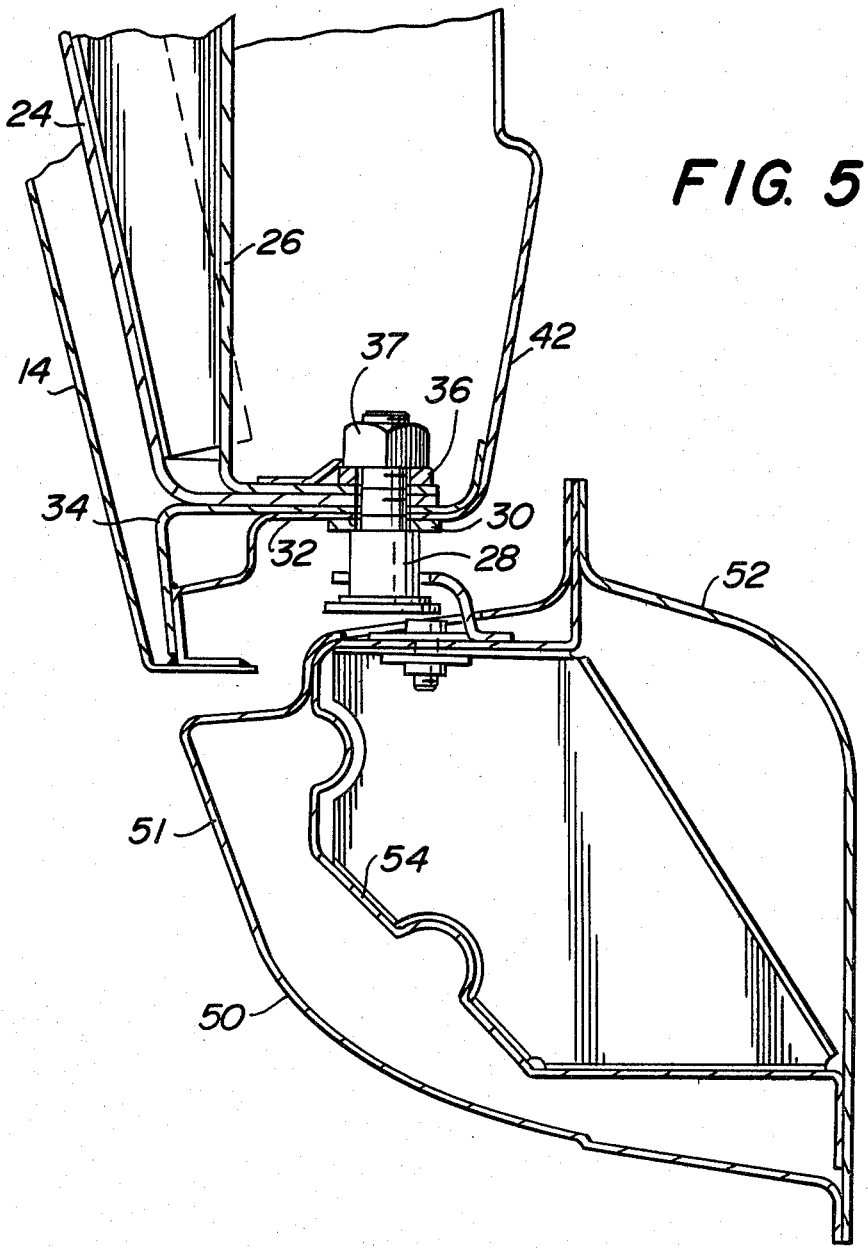
FIG. 5 is a cross-sectional view of an enlarged portion illustrated in a circle 5 in FIG. 3, along with part of the side sill.
Figure 6:
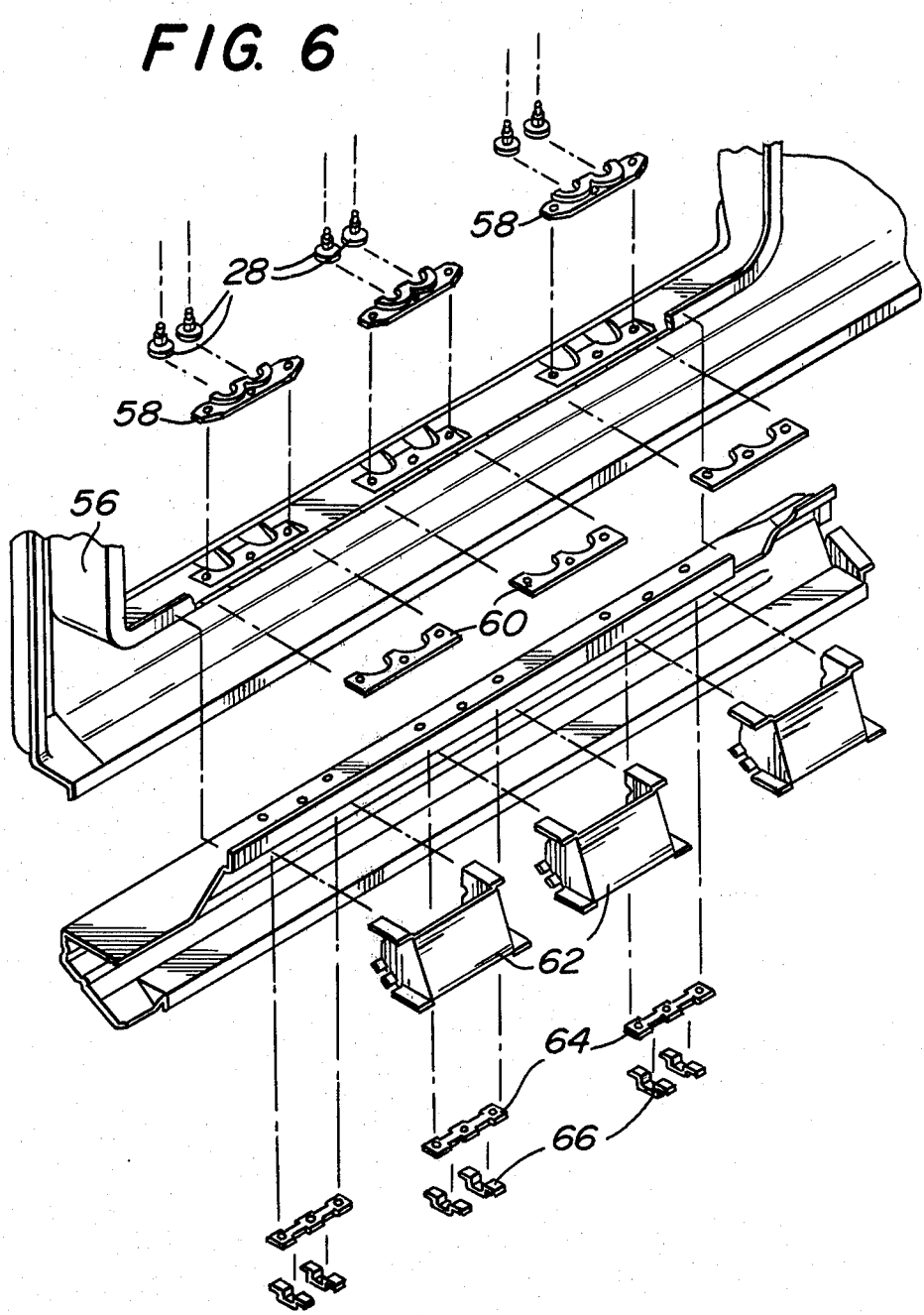
FIG. 6 is an exploded view illustrating details of the side sill as related to the connecting elements of the door.

Referring to FIGS. 5 and 6, details of the side sill 50 are illustrated. The side sill assembly 50 includes an outer sill 51 suitably secured to an inner sill 52. The inner and outer sills 51 and 52 provide an enclosure identical to those used in side sills in many conventional automobiles. A side sill reinforcement member 54 is disposed within the main side sill 50. The details relating to the side sill 50 illustrated in FIG. 5 are shown in FIG. 6.

A side sill quarter panel assembly flange 56 is provided (FIG. 6). The side sill reinforcement member 54 is suitably secured to the quarter panel assembly flange 56. A plurality of bracket retainers 58 are connected to the quarter panel 56 and adapted to receive the studs 28 of the door. Shim 60 may also be provided below the quarter panel 56.

A plurality of side sill brackets 62 are disposed to fit into the side sill reinforcement member 54. Brackets 64 and clips 66 are provided to maintain the assembly in place. The reinforcement side sill 54 greatly enhances the strength of the conventional side sill 50 thus making it more capable of accepting any loads applied thereto. In addition, the side sill brackets 62 further strengthens the side sill reinforcement 54. The added strength is necessary in the area at which impact forces might be transmitted from the studs 28, through the bracket retainers 58 to the side sill. These forces are directly received by the side sill brackets 62.

When the studs 28 are inserted in the bracket retainers 58, as when the door is closed, interlocking means are provided between the door and the side sill to transmit the load on the door beam 18 directly to the side sill. Because the side sill has a very strong structure, it is capable of sustaining the forces from the interlocking means. In effect, the arrangement has provided means to extend the door beam down to the bottom of the door. The beam in effect is directly connected to the side sill.

When the door 10 is subjected to a side impact from the outside, the studs 28 engage the bracket retainers 58. The purpose of the brackets 64 is that the studs and bracket retainers 58 alone are not capable of taking the load and therefore reinforcements at the areas of forces are necessary. When the force reaches the side sill, it is transmitted to the "A" and "B" posts of the automobile along with the floor pan.

Figure 9:
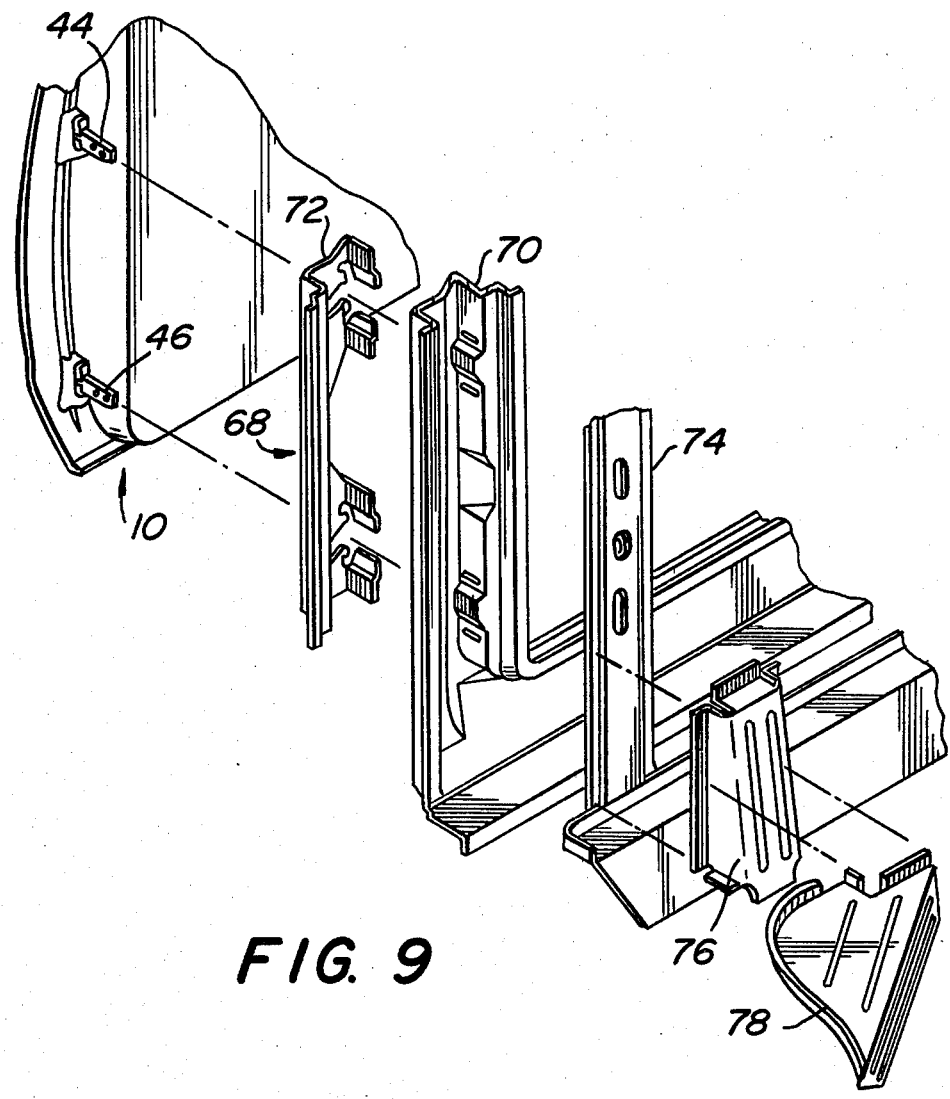
FIG. 9 is an exploded view illustrating details of the "A" post, in accordance with the present invention.

Referring to FIG. 9, an exploded view illustrating details of the "A" post is illustrated. The door 10 is adapted to be connected to a reinforced "A" post connected as part of the main body of the car, the details of which are not illustrated. The reinforced "A" post comprises an outer reinforcement "A" post 68 with reinforcement section 72. The post 70 is disposed between the outer reinforcement member 68 and an inner "A" post 74. The posts 72 and 74 are conventional with the added post 68 with its reinforcement section 72 providing means to reinforce the convention posts.

A reinforcement member 76 is secured to the rear of the inner "A" post 74. A member 78 provides a post stiffening member. The purpose of the members 76 and 78 is to provide an anti-twisting brace for the "A" post assembly which includes posts 68, 70 and 74.

The purpose of the "A" post reinforcements among other things, is to prevent the hinges 44 and 46, which are normally attached to the "A" post assembly in a conventional manner, from pealing away from the "A" post assembly. The portion 72 in effect wraps around the hinges 44 and 46 to prevent the pealing action. Thus upon impact, the main "A" post 70 will not tend to be rotated and the hinges 44 and 46 will tend to be secured to the main "A" post 70. In effect, the reinforcement member 68 and portion 72, which receive the hinges therethrough, acts as a doubler to protect the hinge brackets.

Figure 10:
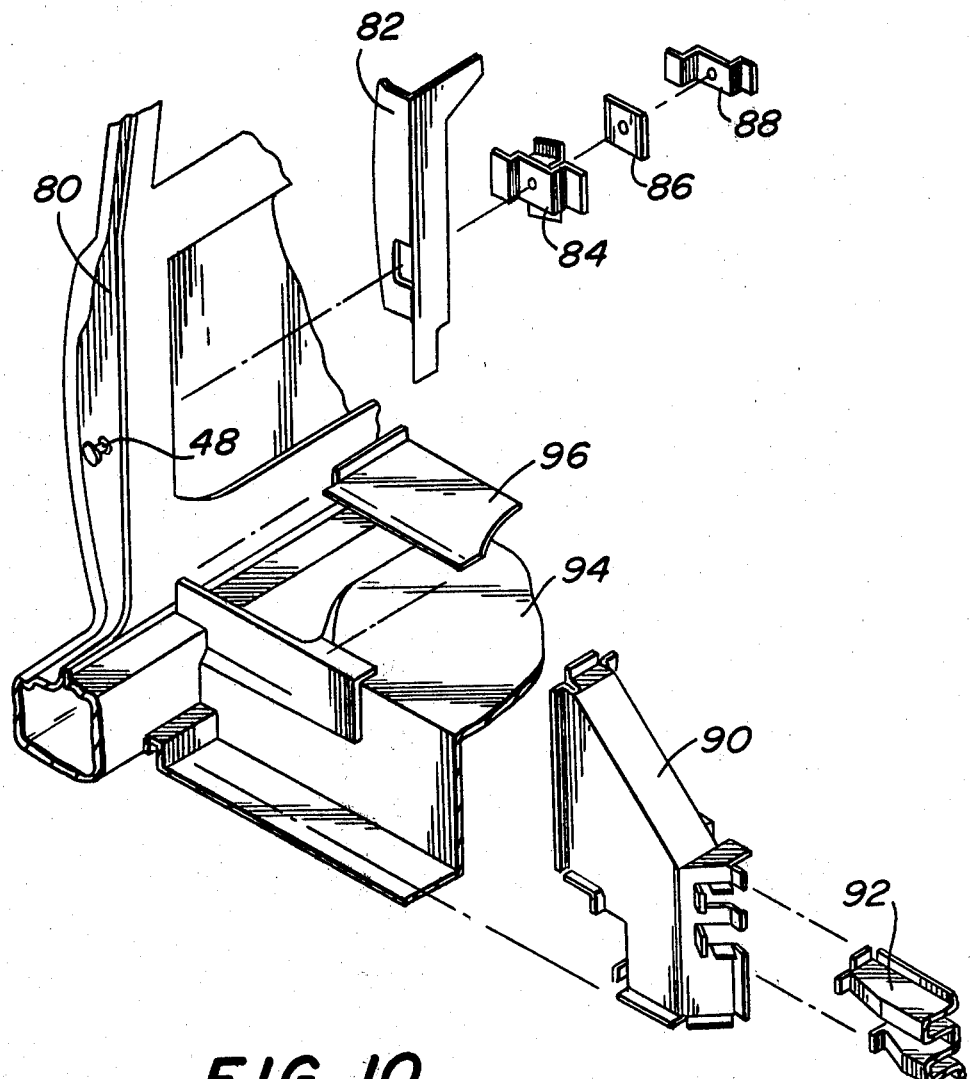
FIG. 10 is an exploded view illustrating details of the "B" post, in accordance with the present invention.

Referring to FIG. 10, details of the "B" post are illustrated. The "B" post is disposed on the latch side of the door and built into the automobile body in a conventional manner and the details relating to the overall car body are not illustrated. The "B" post area 80 is dimensioned to receive a reinforcement member 82. The member 82 is held in place by means of a tapping plate 84, secured to a plate 86. A plate retainer element 83 is also provided.

The pin 48 is disposed to be aligned with the lower hinge of the door. Formerly, the latch mechanism was used as the transmitting medium between the door and the "B" post, however the latch is still retained to permorm its intended task as a door latch.

A brace 90 is provided so that it is in alignment with the pin 48 so as to sustain forces therefrom upon impact. The force from the brace 90 is transmitted to cross beams such as cross beams 92. Various other elements illustrated include the floor 94 and a rear feet riser 96.

Figure 8:
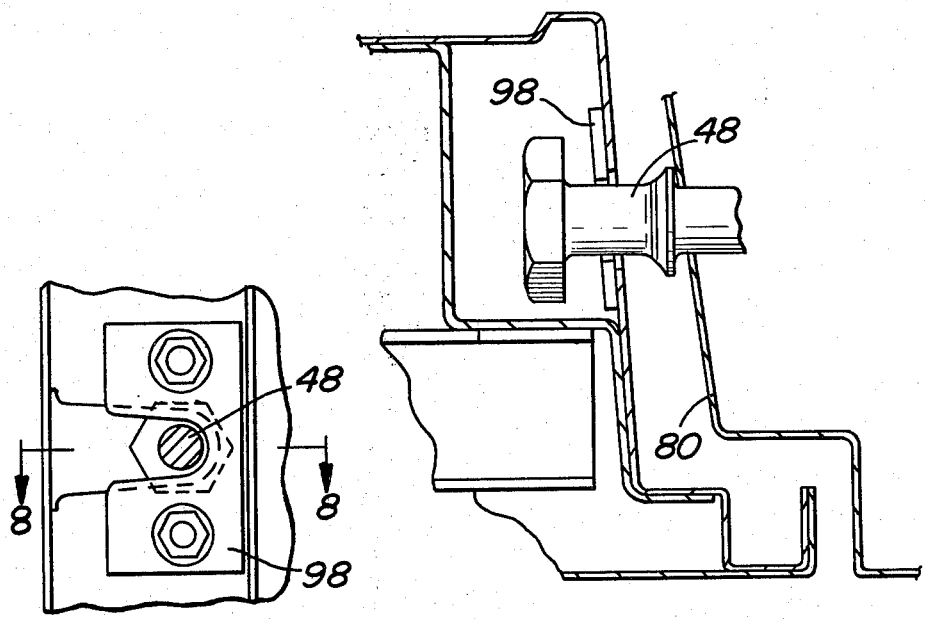
FIG. 8 is a cross-sectional view taken along lines 8—8 of FIG. 7.

In FIGS. 7, 8 and 10, the pin 48 is connected to the "B" post 80. The pin 48 is closely aligned with respect to height as a bumper of many conventional cars (not illustrated) because that is the area at which the door will generally receive maximum impact forces. It is also aligned with the lower front hinge of the door so that impact forces against the door will be transmitted from the door, goes through the front hinge 46 and pin element 48 to the posts. The pin 48 is disposed to move into a latching receptable member 98 which is secured to the edge of the door. However, pin 48 is a passive pin and not a latching pin. While the pin 48 does not latch when the door moves in the door as a result of a high side impact, the pin 48 engages the receptacle 98 and transfers the load from the door to the "B" post.

The various reinforcement means makes the "B" post capable of sustaining the loads from the beam 18 without tending to twist or rotate. As illustrated in FIG. 19, the brace 90 also transmits some of the energy to the floor member 94.

It is thus seen that the present invention has provided a reinforced door which is capable of transmitting impact forces from a beam in a door directly to the "A" and "B" posts as well as the side sills. All of the elements receiving the forces from the beam have been reinforced to make them capable of receiving the increased forces transmitted by the beam.

What is claimed is:

1. In an automobile having a first and second vertical post for receiving a door therebetween and a side sill connected below said door between said first and second posts,
   means for reinforcing said door and for transmitting impact forces applied to said door to said first and second posts and said side sill comprising:
   (a) a beam having a relatively constant cross section extending horizontally between the front and rear edges of said door and means for transmitting impact forces applied to said door and said beam to said first and second posts;
   (b) a plurality of extension members connected to said beam extending downwardly therefrom to the bottom edge of said door; and
   (c) a plurality of interlock members connecting said extension members from the bottom of said door to said side sill to transmit impact forces from said beam to said side sill.

2. Means for reinforcing as set forth in claim 1 wherein said interlock members include stud elements connected to the ends of said extension members disposed to be moved into bracket retainer members connected to said side sill when said door is closed.

3. Means for reinforcing as set forth in claim 2 wherein said door includes top and bottom hinges connected between the front edge of said door and said first post whereby forces applied to said door are transmitted to said first post.

4. Means for reinforcing as set forth in claim 3 wherein said rear edge of said door includes a latching member disposed to receive a pin member connected to said second post.

5. Means for reinforcing as set forth in claim 4 wherein said latching member and said pin member are aligned with said beam and said lower hinge of said door.

6. Means for reinforcing as set forth in claim 5 wherein a reinforcement brace is secured to said second post in alignment with said pin member.

7. Means for reinforcing as set forth in claim 6 wherein said first post comprises a main post surrounded by an outer reinforcement post, said hinges of said door being connected to said outer reinforcement post to receive forces directly therefrom in the event of side impacts against said door.

8. Means for reinforcing as set forth in claim 7 wherein said side sill member comprises a main outer sill housing having an inner reinforcement sill member disposed therein.

9. Means for reinforcing as set forth in claim 8 wherein a plurality of reinforcement brackets are connected in said side sill, said plurality of reinforcement brackets being aligned with said extension members on said beam and said bracket retainer members on said side sill.

10. Means for reinforcing as set forth in claim 9 wherein said second post includes a reinforcement plate member.

* * * * *